United States Patent
Jolivet et al.

(10) Patent No.: US 8,060,142 B2
(45) Date of Patent: Nov. 15, 2011

(54) METHOD FOR REDUCING POWER CONSUMPTION FOR DETACHABLE CARD AND MOBILE COMMUNICATION TERMINAL THEREOF

(75) Inventors: Paul Jolivet, Juvisy sur Orge (FR); Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/301,964

(22) PCT Filed: May 21, 2007

(86) PCT No.: PCT/KR2007/002459
§ 371 (c)(1),
(2), (4) Date: Jul. 19, 2010

(87) PCT Pub. No.: WO2007/136210
PCT Pub. Date: Nov. 29, 2007

(65) Prior Publication Data
US 2010/0285841 A1    Nov. 11, 2010

Related U.S. Application Data

(60) Provisional application No. 60/803,060, filed on May 24, 2006.

(51) Int. Cl.
*H04M 1/00* (2006.01)
(52) U.S. Cl. ........................ 455/558; 455/557
(58) Field of Classification Search ............. 455/557, 455/558, 550.1, 575.1, 343.1–343.5, 127.1, 455/127.5, 66.1, 90.3, 572, 574
See application file for complete search history.

(56) References Cited

U.S. PATENT DOCUMENTS

| | | | |
|---|---|---|---|
| 5,687,216 A * | 11/1997 | Svensson | 455/550.1 |
| 5,778,322 A * | 7/1998 | Rydbeck | 455/558 |
| 5,867,795 A * | 2/1999 | Novis et al. | 455/557 |
| 7,376,444 B2 * | 5/2008 | Kao et al. | 455/575.1 |
| 7,520,438 B2 * | 4/2009 | Kim et al. | 235/492 |
| 2002/0103009 A1 * | 8/2002 | Sato | 455/558 |
| 2009/0181721 A1 * | 7/2009 | Nishizawa et al. | 455/558 |

* cited by examiner

*Primary Examiner* — Lana N Le
(74) *Attorney, Agent, or Firm* — Lee, Hong, Degerman, Kang & Waimey

(57) ABSTRACT

Disclosed are a method for reducing power consumption of a card for a mobile communication terminal and a mobile communication terminal thereof, in which power consumption of a battery is reduced by differently supplying voltage to first and second cards according to an operation or non-operation state of the first card or the second card.

5 Claims, 5 Drawing Sheets

[Fig. 1]
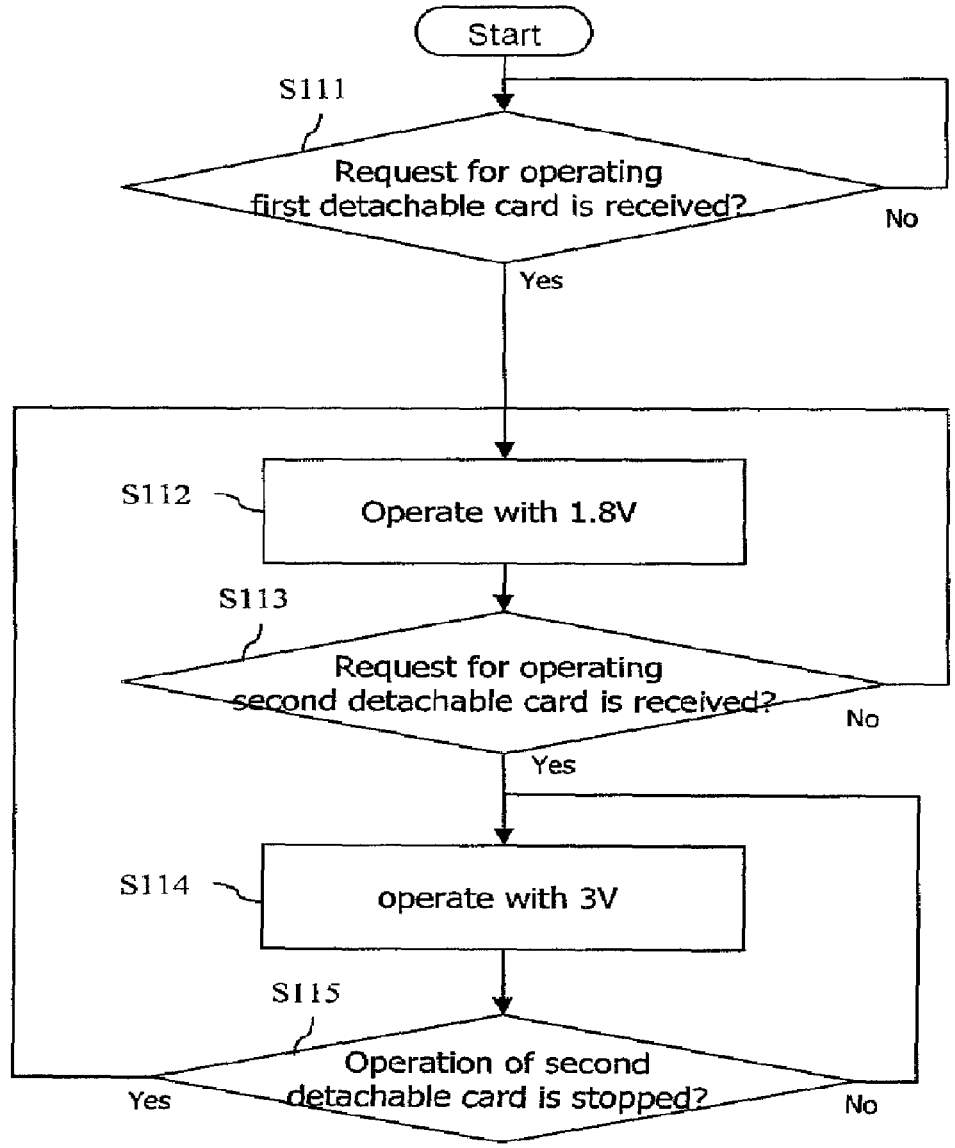

[Fig. 2]
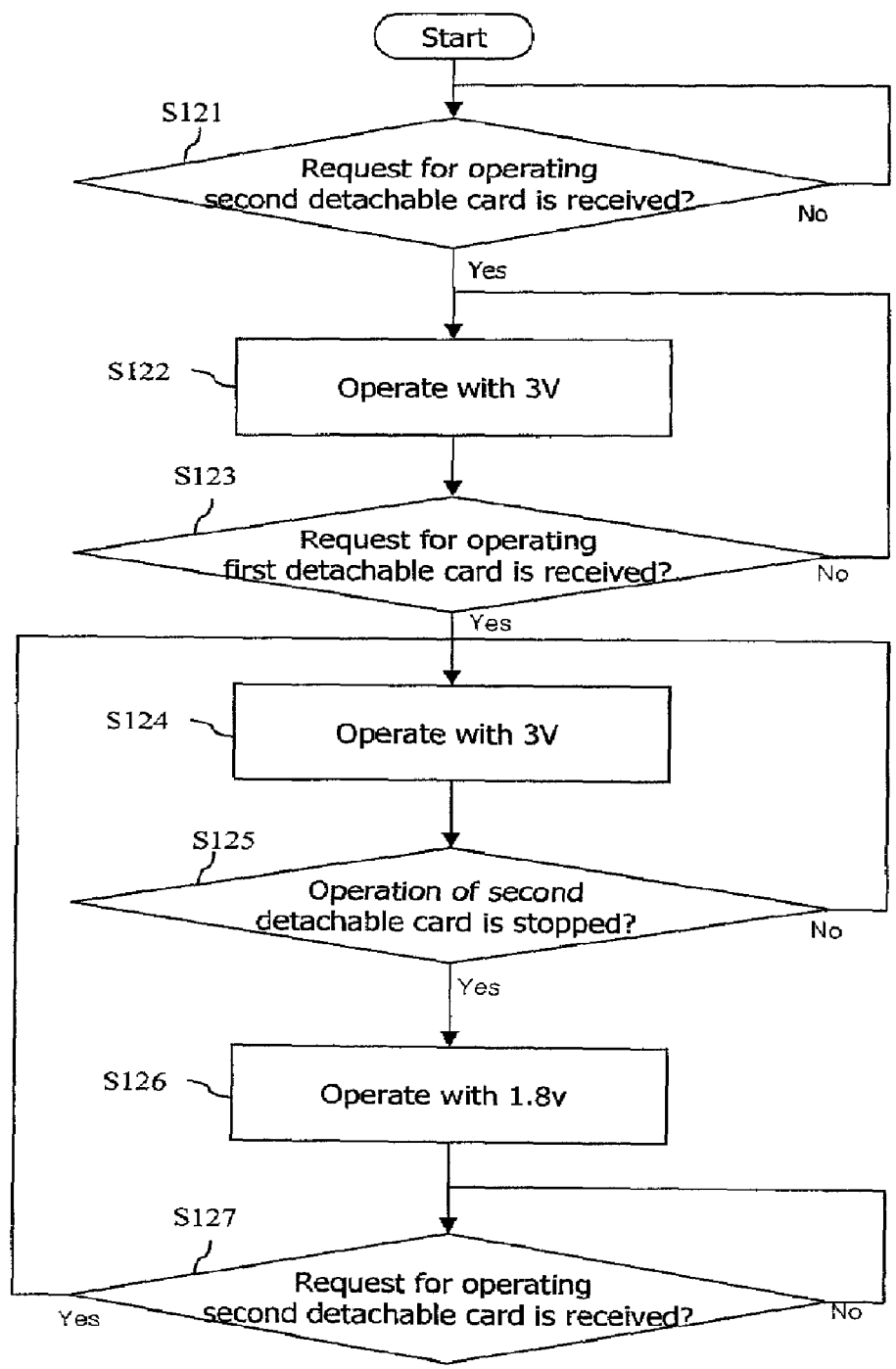

[Fig. 3]
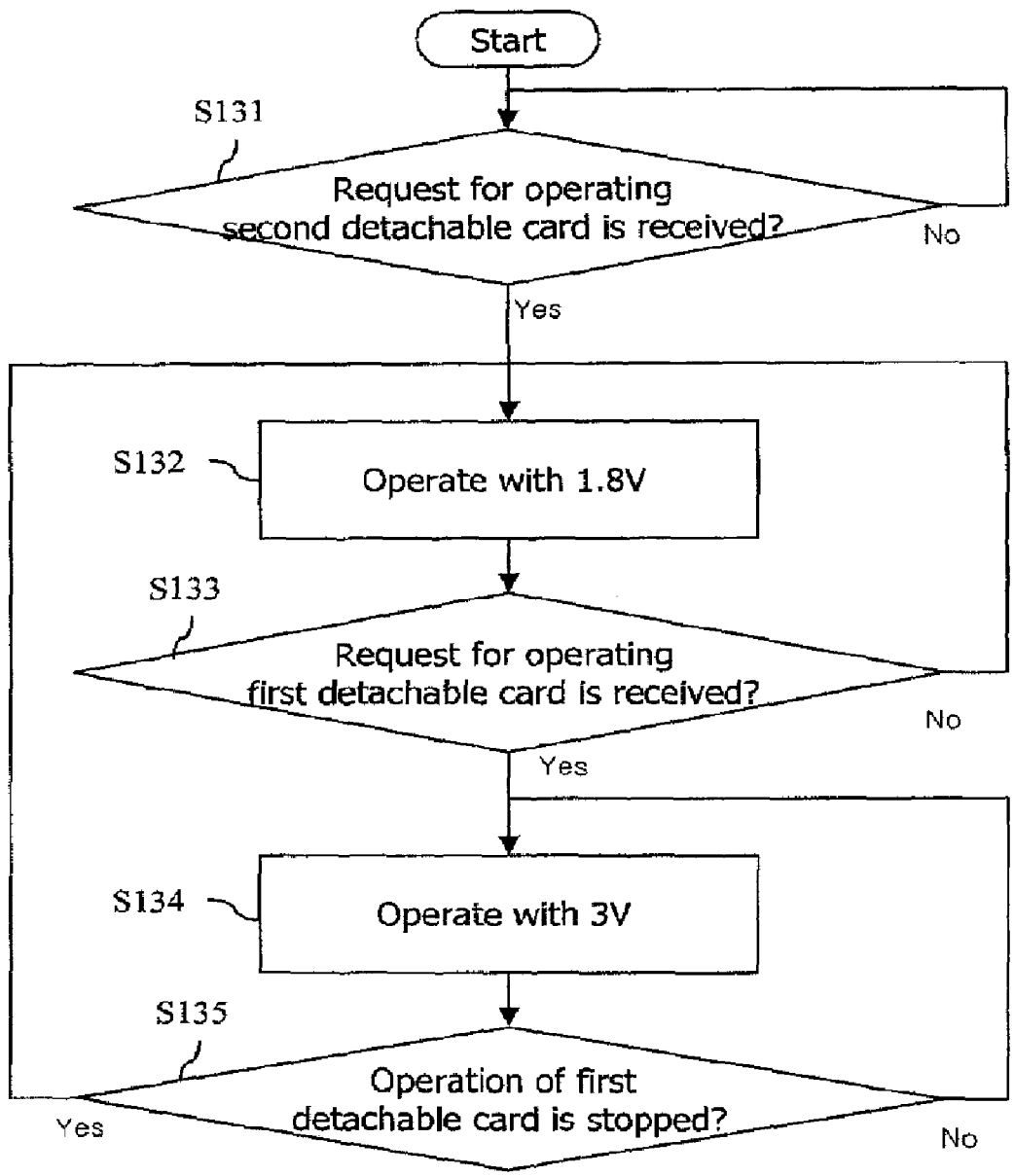

[Fig. 4]
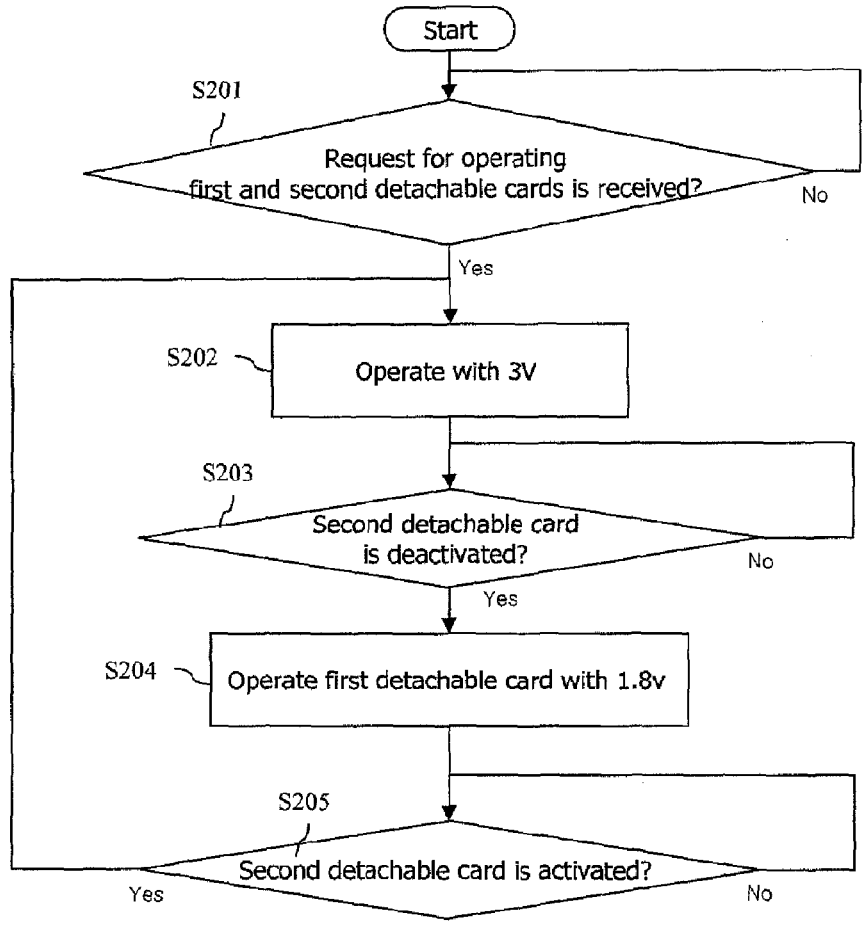
[Fig. 5]
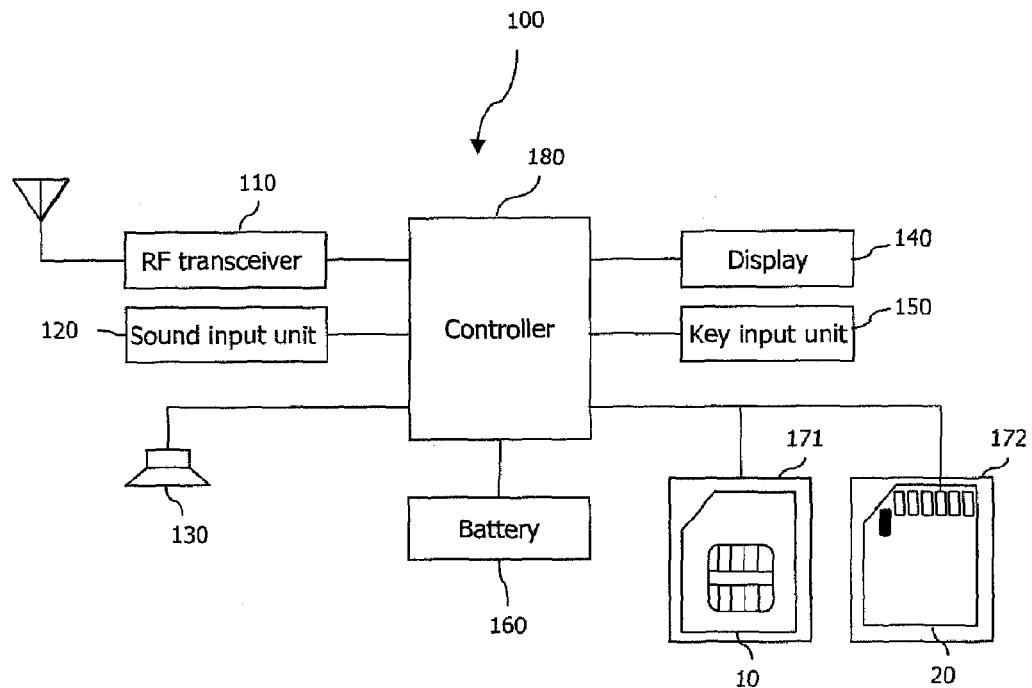

[Fig. 6]
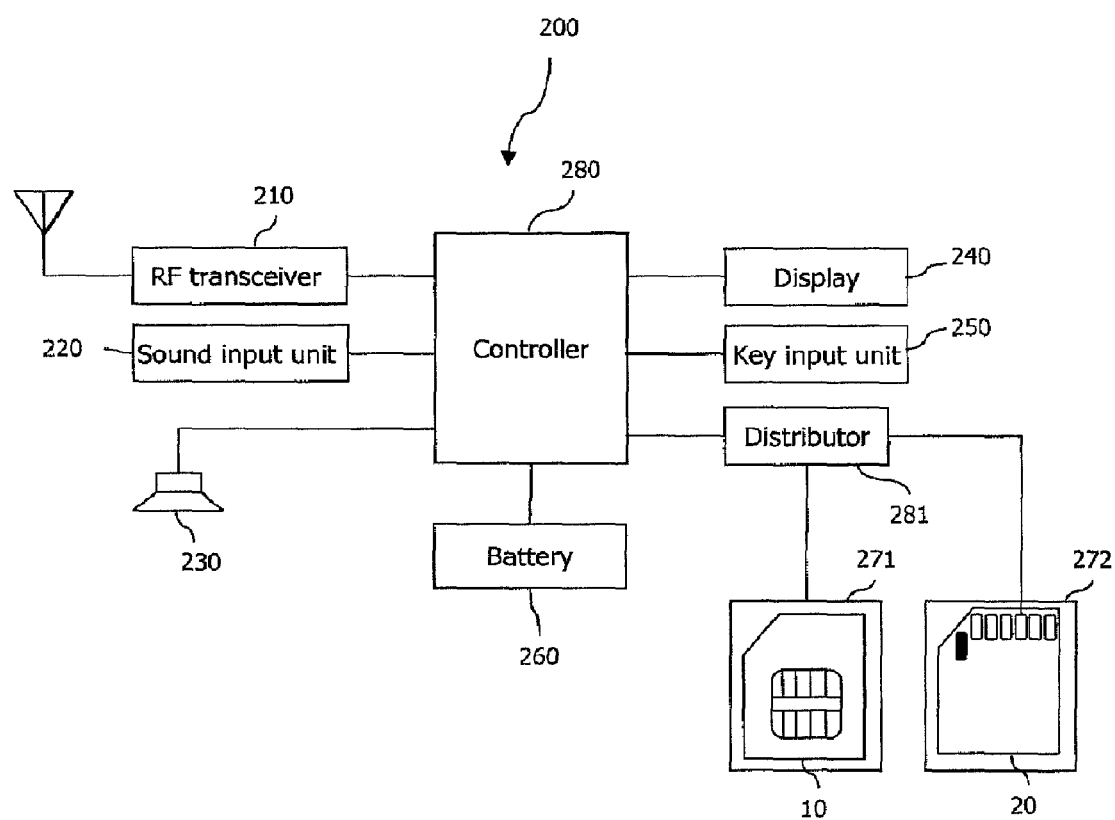

US 8,060,142 B2

METHOD FOR REDUCING POWER CONSUMPTION FOR DETACHABLE CARD AND MOBILE COMMUNICATION TERMINAL THEREOF

The present disclosure relates to subject matter contained in priority U.S. Provisional Application No. 60/803,060, filed on May 24, 2006, which is herein expressly incorporated by reference in its entirety.

DISCLOSURE OF INVENTION

Technical Solution

The present disclosure relates to a method for supplying power to a detachable card, and more particularly, to a method for reducing power consumption of a detachable card.

Generally, a mobile communication terminal is provided with a first detachable card called as a subscriber identity module (SIM) or a user identity module (UIM) therein.

The SIM card is a detachable card for a GSM-based mobile communication terminal, and consists of a microprocessor and a memory chip. The SIM card is largely classified into an IC card type and a plug-in type. The SIM card has all information therein necessary to operate the mobile communication terminal, and has encrypted data therein including not only a user's private information but also relevant information such as a phone number and a network number.

The UIM card is a detachable smart card for a CDMA-based mobile communication terminal, and performs the same function as the SIM card. That is, the UIM card includes information regarding a network set, a priority, a user set, a phone number, and an access security.

The mobile communication terminal may be provided with a second detachable card for storing a user's data, i.e., a sound file, a moving image file, a data file, etc.

In the related art mobile communication terminal mounted with the first detachable card and the second detachable card, the first detachable card and the second detachable card are operated with the same driving voltage. That is, despite that the first detachable card can be operated with a voltage lower than that of the second detachable card, the first and second detachable cards are operated with the same high voltage. Accordingly, a power consumption of a battery for the mobile communication terminal is increased, thereby shortening a usage time.

Therefore, an object of the present disclosure is to provide a method and a mobile communication terminal for supplying, if possible, a low voltage to at least one of a first detachable card and a second detachable card.

Also, an other object of the present disclosure is to provide a method and a mobile communication terminal for supplying different voltages to each of the first and second detachable cards so that at least one of the first and second detachable cards may be provided with a low voltage though the other of them may be provided with a high voltage.

To achieve these and other advantages and in accordance with the purpose of the present disclosure, as embodied and broadly described herein, there is provided a method for reducing power consumption of a detachable card for a mobile communication terminal, comprising: receiving a request for operating a first detachable card; operating the first detachable card with a low voltage, if the first detachable card can be operated with a low voltage; receiving a request for operating a second detachable card; operating the first and second detachable cards with a high voltage, when the second detachable card can not be operated with a low voltage.

According to another aspect of the present disclosure, there is provided a method for reducing power consumption of a detachable card for a mobile communication terminal, comprising: operating first and second detachable cards with a high voltage; receiving a request for stopping the operation of one of the first and second detachable cards; operating another card with a low voltage if the another card can be operated with a low voltage.

To achieve these and other advantages and in accordance with the purpose of the present disclosure, as embodied and broadly described herein, there is provided a mobile communication terminal, comprising: a first detachable card receiving unit for receiving a first detachable card; a second detachable card receiving unit for receiving a second detachable card; a power supply unit for supplying power to the first and second detachable cards each mountable at the first and second detachable card receiving units; and a controller for controlling the power supply unit so that voltage may be differently supplied, according to whether the first detachable card or the second detachable card is operated or not, to the first and second detachable cards.

The foregoing and other objects, features, aspects and advantages of the present disclosure will become more apparent from the following detailed description of the present disclosure when taken in conjunction with the accompanying drawings.

The accompanying drawings, which are included to provide a further understanding of the invention and are incorporated in and constitute a part of this specification, illustrate embodiments of the invention and together with the description serve to explain the principles of the invention.

IN THE DRAWINGS

FIG. 1 is a flowchart showing a method for reducing power consumption of a detachable card for a mobile communication terminal according to a first embodiment of the present disclosure;

FIG. 2 is a flowchart showing a method for reducing power consumption of a detachable card for a mobile communication terminal according to another aspect of the first embodiment of the present disclosure;

FIG. 3 is a flowchart showing a method for reducing power consumption of a detachable card for a mobile communication terminal according to still another aspect of the first embodiment of the present disclosure;

FIG. 4 is a flowchart showing a method for reducing power consumption of a detachable card for a mobile communication terminal according to a second embodiment of the present disclosure;

FIG. 5 is a block diagram showing a mobile communication terminal according to the present disclosure; and FIG. 6 is a block diagram showing a mobile communication terminal according to another aspect of the present disclosure.

Reference will now be made in detail to the preferred embodiments of the present disclosure, examples of which are illustrated in the accompanying drawings.

A first detachable card used in the present disclosure may be a subscriber identity module (SIM), a user identity module (UIM), a universal SIM (USIM), or a universal IC card (UICC). The USIM is an extension module from the SIM and the UIM, and is mainly used in the $3^{rd}$ generation mobile communication, WCDMA mobile communication. Also, the UICC is an extension module from the SIM or the UIM, and may be applied to a financial industry, a medical industry, etc.

The first detachable card, e.g., the UICC could be operated, according to various situations, with any one of voltages of the various types as followed.

The first detachable card, i.e., the UICC can be operated with any one of about 5V of a class A (not being currently used due to a very high voltage), about 3V of a class B, and about 1.8V of a class C Also, the first detachable card, i.e., the UICC may be operated with about 1V or less of a class D.

The second detachable card may be a flash memory, more concretely, a multimedia card (MMC), further more particularly, at least one of an SD/MMC, an Mini-SD, or a Micro-SD (T-flash). The second detachable card serves to store a user's data including a multimedia file such as a sound file and a moving image file in a mobile communication terminal.

The second detachable card may be operated with approximately 5V in a computer, and may be operated with approximately 3V in a mobile communication terminal. The enhanced second detachable card may be operated with two or more voltages according to each condition. That is, the enhanced second detachable card may be operated with 2.7~3.6V at a situation requiring a high voltage, and may be operated with 1.65~1.95V at a situation requiring a low voltage. The second detachable card operated with two voltages according to each circumstance is called as a dual voltage multimedia card (MMC).

FIG. 1 is a flowchart showing a method for reducing power consumption of a detachable card for a mobile communication terminal according to a first embodiment of the present disclosure.

Referring to FIG. 1, a power consumption of a battery is reduced by supplying a low voltage, if possible. It is assumed in FIG. 1 that the first detachable card is a UICC. And, it is assumed that the first detachable card is firstly operated than the second detachable card. Also, it is assumed that the first detachable card can be operated with a low voltage, i.e., approximately 1.8V of the class C and the second detachable card can be operated with a high voltage, i.e., about 3V.

More concretely, when a request for operating the first detachable card is received (S111), a mobile communication terminal determines (or, checks) whether the first detachable card can be operated with a low voltage. When it is determined that the first detachable card can be operated with a low voltage, the mobile communication terminal operates the first detachable card with a low voltage (approximately 1.8V) (S112). Here, the request for operating the first detachable card may represent that the first detachable card is mounted at the mobile communication terminal. Also, the request may represent that the mobile communication terminal establishes a session with the first detachable card after the first detachable card is mounted at the mobile communication terminal. That is, the request may represent that the mobile communication terminal accesses to (or, uses) the first detachable card.

Next, if a request for operating the second detachable card is received (S113), the mobile communication terminal determines (or, checks) whether the second detachable card can be operated with a low voltage. When it is determined that the second detachable card can not be operated with a low voltage, the mobile communication terminal operates the first and second detachable cards with a high voltage (i.e., about 3V) (S114). Here, the request for operating the second detachable card indicates that the second detachable card is mounted at the mobile communication terminal, or the mobile communication terminal establishes a session with the second detachable card.

Next, if a request for stopping the operation of the second detachable card is received (S115), the mobile communication terminal is returned to S112 for operating the first detachable card with a low voltage (1.8V). Herein, the request for stopping the operation of the second detachable card may represent that the second detachable card is separated from the mobile communication terminal, or is not used even if it is not separated from the mobile communication terminal.

FIG. 2 is a flowchart showing a method for reducing power consumption of a detachable card for a mobile communication terminal according to another aspect of the first embodiment of the present disclosure.

Referring to FIG. 2, in the same manner as FIG. 1, power consumption of a battery is reduced by supplying a low voltage, if it is possible. FIG. 2 is different from FIG. 1 in that the second detachable card is firstly operated than the first detachable card.

More concretely, when a request for operating the second detachable card is received (S121), the mobile communication terminal determines whether or not the second detachable card can be operated with a low voltage. When it is determined that the second detachable card can not be operated with a low voltage, the mobile communication terminal operates the second detachable card with a high voltage (3V) (S122).

Next, if a request for operating the first detachable card is received (S123), the mobile communication terminal operates the first and second detachable cards with a high voltage (approximately 3V) (S124). Here, since the second detachable card can not be operated with a low voltage, the first and second detachable cards are operated with a high voltage (approximately 3V).

Next, if a request for stopping the operation of the second detachable card is received (S125), the mobile communication terminal determines whether or not the first detachable card can be operated with a low voltage. When it is determined that the first detachable card can be operated with a low voltage, the mobile communication terminal operates the first detachable card with a low voltage (1.8V) (S126).

Next, if a request for operating the second detachable card is again received, the mobile communication terminal is returned to S124 for operating the first and second detachable cards with a high voltage (3V).

FIG. 3 is a flowchart showing a method for reducing power consumption of a detachable card for a mobile communication terminal according to still another aspect of the first embodiment of the present disclosure.

Referring to FIG. 3, in the same manner as FIGS. 1 and 2, power consumption of a battery is reduced by supplying a low voltage, if it is possible. In FIG. 3, it is assumed that the second detachable card is firstly operated than the first detachable card. Also, it is assumed that the second detachable card is a dual voltage MMC and is operated with a low voltage (1.65~1.95V) which is a low voltage between two or more voltages. And, it is assumed in FIG. 3. that the first detachable card is a UICC and is operated with a high voltage (approximately 3V) in the class B.

More concretely, when a request for operating the second detachable card is received (S131), the mobile communication terminal determines whether or not the second detachable card can be operated with a low voltage. When it is determined that the second detachable card can be operated with a low voltage, the mobile communication terminal operates the second detachable card with a low voltage (approximately 1.65~1.95V, preferably 1.8V) (S132).

Next, if a request for operating the first detachable card is received (S133), the mobile communication terminal determines whether or not the first detachable card can be operated with a low voltage. When it is determines that the first detachable card can not be operated with a low voltage, the mobile communication terminal operates the first and second detachable cards with a high voltage (3V) (S134).

Next, if a request for stopping the operation of the first detachable card is received (S135), the mobile communication terminal is returned to S132 for operating the second detachable card with a low voltage.

As aforementioned, power consumption of a battery can be reduced by supplying a low voltage, if possible.

FIG. 4 is a flowchart showing a method for reducing power consumption of a detachable card for a mobile communication terminal according to a second embodiment of the present disclosure.

Referring to FIG. 4, if one of the first and second detachable cards being operated is deactivated, a low voltage is supplied to the other card, if it is possible. Herein, the deactivation may represent that the mobile communication terminal does not access to (use) one of the first and second detachable cards (i.e. temporarily deactivates a session with the card).

More concretely, when a request for operating the first and second detachable cards is received (S201), the mobile communication terminal determines whether or not the first and the second detachable card can be operated with a low voltage. When it is determined that the first and the second detachable card can not be operated with a low voltage, the mobile communication terminal operates the first and second detachable cards with a high voltage (3V) (S202).

Next, if the second detachable card is temporarily deactivated (S203), the mobile communication terminal determines whether or not the first detachable card can be operated with a low voltage. When it is determined that the first detachable card can be operated with a low voltage, the mobile communication terminal operates the first detachable card with a low voltage (approximately 1.8V). Whether or not the second detachable card is temporarily deactivated may be determined by a timer. That is, if the second detachable card for the mobile communication terminal is determined not to have been used after lapse of a predetermined time set by the timer, it is determined that the second detachable card is deactivated. Herein, the predetermined time set by the timer may be optimized so as to minimize power consumption of the battery and to minimize the number of times that a voltage is changed. The optimization may be easily implemented by those skilled in the art, and thus is not numerically represented in the present disclosure.

Next, if the second detachable card is activated (S205), the mobile communication terminal is returned to S202 for operating the first and second detachable cards with a high voltage (3V).

According to the second embodiment, when one of the first and second detachable cards is temporarily deactivated, if another can be operated with a low voltage, a low voltage is supplied to the another card. Accordingly, power consumption of the battery is minimized.

The method of the present disclosure may be implemented in a software manner, in a hardware manner, or in a combination manner therebetween. For instance, the method of the present disclosure may be implemented with a storage medium (e.g., an inner memory of a mobile communication terminal, a flash memory, a hard disc, etc.), or may be implemented by codes or commands inside a software program that can be executed by a processor (e. g, a microprocessor inside a mobile communication terminal).

FIG. 5 is a block diagram showing a mobile communication terminal according to the present disclosure.

Referring to FIG. 5, the mobile communication terminal 100 may comprise an RF transceiver 110, a sound input unit 120, a sound output unit 130, a display 140, a key input unit 150, a battery (power supply unit) 160, a first detachable card receiving unit 171 for receiving a first detachable card 10, a second detachable card receiving unit 172 for receiving a second detachable card 20, and a controller 180. The first detachable card 10 and the second detachable card 20 are the same cards as the aforementioned cards.

The RF transceiver 110 may consist of electronic components for transceiving an electric wave. The RF transceiver 110 may consist of electronic components for supporting CDMA, GSM, GPRS, TDMA, IMT-2000, WCDMA, HSDPA, IEEE 802. 11, IEEE802. 16-based communication, etc. The RF transceiver 110 is electrically connected to the controller 180, and performs a communication under control of the controller 180.

The sound input unit 120 receives a user's voice, and may be implemented as a microphone. The sound input unit 120 is controlled by the controller 180. The sound output unit 130 outputs another party's voice during a calling, or outputs each sound generated from the mobile communication terminal 100 (i.e., music, moving image, game, etc.). The sound output unit 130 is electrically connected to the controller 180 thus to be controlled.

The display 140 may be implemented as a liquid crystal display (LCD) or an organic light emitting diode (OLED). The display 140 is electrically connected to the controller 180 thus to be controlled, and displays a screen according to each function of the mobile communication terminal 100.

The key input unit 150 for receiving a signal inputted by a user is connected to the controller 180, and transmits the received signal to the controller 180.

The battery 160 supplies a power to the RF transceiver 110, the sound input unit 120, the sound output unit 130, the display 140, the key input unit 150, the first detachable card 10, the second detachable card 20, and the controller 180.

The controller 180 consists of a plurality of semiconductor devices, and is electrically connected to the RF transceiver 110, the sound input unit 120, the sound output unit 130, the display 140, the key input unit 150, the battery 160, the first detachable card receiving unit 10, and the second detachable card receiving unit 20.

As shown in FIGS. 1 to 3, the controller 180 differently supplies voltage according to whether both of the first and the second detachable card 10 and 20 are operated, or any one of them is operated, more concretely, whether both the first and second detachable card 10 and 20 are mounted in each of the first and second detachable card receiving unit 171 and 172, or whether the mobile communication terminal 100 establishes sessions with both of them being mounted or one session with any one of them being mounted, thereby reducing power consumption of the battery 160.

As shown in FIG. 4, if one of the first and second detachable cards being operated is deactivated and if the other card of them can be operated with a low voltage, the controller 180 supplies a low voltage to the other card. Accordingly, power consumption of the battery 160 is reduced. Herein, the controller 180 may operate a timer provided therein so as to determine whether or not one of the first and second detachable cards is deactivated. That is, the controller 180 can monitor whether one of the first and second detachable cards has not been used after lapse of a predetermined time.

FIG. 6 is a block diagram showing a mobile communication terminal according to another aspect of the present disclosure.

Referring to FIG. 6, a mobile communication terminal 200 according to another aspect of the present disclosure supplies different voltages to first and second detachable cards 10 and 20 through a voltage distributor.

The mobile communication terminal 200 may comprise an RF transceiver 210, a sound input unit 220, a sound output unit 230, a display 240, a key input unit 250, a battery (power supply unit) 260, a first detachable card receiving unit 271 for receiving the first detachable card 10, a second detachable card receiving unit 272 for receiving the second detachable card 20, a controller 280, and a voltage distributor 281. The first detachable card 10 and the second detachable card 20 are the same cards as the aforementioned cards. Explanation for components having the same function as those of FIG. 5 will be omitted.

The voltage distributor 281 may receive a low voltage (1.8V) from the battery 260. Then, the voltage distributor 281 may provide the low voltage (1.8V) to the first detachable card 10, and a high voltage (3V which is obtained by boosting the 1.8V) to the second detachable card 20 according to a control signal from the controller 280.

The voltage distributor 281 may receive a high voltage (3V) from the battery 260. Then, the voltage distributor 281 may provide a low voltage (1.8V which is obtained by reducing the 3V) to the first detachable card 10, and a high voltage (3V) to the second detachable card 20 according to a control signal from the controller 280.

The voltage distributor 281 may not provide a voltage to a deactivated card according to a control signal from the controller 280.

The controller 280 provides a control signal for boosting into 3V or reducing into 1.8V to the voltage distributor 281 according to an operation or non-operation state of the first detachable card or the second detachable card (i.e., according to whether the first detachable card 10 is mounted in the first detachable card receiving unit 271, whether the second detachable card 20 is mounted in the second detachable card receiving unit 272, or whether the mobile communication terminal 100 establishes sessions with them being mounted).

The controller 280 may provide the voltage distributor 281 with a control signal for providing no voltage to a deactivated card.

In the present disclosure, different voltages are supplied to the first and second detachable cards according to an operation or non-operation state of the first detachable card or the second detachable card, thereby reducing power consumption of the battery.

Furthermore, when one of the first and second detachable cards is temporarily deactivated, if the other of them can be operated with a low voltage, a low voltage is supplied to the other card. Accordingly, power consumption of the battery is minimized.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for reducing power consumption of a detachable card for a mobile communication terminal, comprising:
   receiving a request for operating a first card;
   operating the first card with a low voltage, if it is determined that the first card can be operated with the low voltage;
   receiving a request for operating a second card; and
   operating the first and second cards with a high voltage, if it is determined that the second card cannot be operated with the low voltage.

2. The method of claim 1, wherein the request for operating the first card represents at least one of:
   sensing, by the mobile communication terminal, that the first card is mounted at the mobile communication terminal;
   trying, by the mobile communication terminal, to establish a session with the first card after the first card is mounted at the mobile communication terminal;
   trying, by the mobile communication terminal, to access the first card after the first card is mounted at the mobile communication terminal; and
   trying, by the mobile communication terminal, to use the first card after the first card is mounted at the mobile communication terminal.

3. The method of claim 1, wherein the request for operating the second card represents at least one of:
   sensing, by the mobile communication terminal, that the second card is mounted at the mobile communication terminal;
   trying, by the mobile communication terminal, to establish a session with the second card after the second card is mounted at the mobile communication terminal;
   trying, by the mobile communication terminal, to access the second card after the second card is mounted at the mobile communication terminal; and
   trying, by the mobile communication terminal, to use the second card after the second card is mounted at the mobile communication terminal.

4. The method of claim 1, further comprising:
   receiving a request for stopping the operation of the second card; and
   operating the first card with a low voltage, when the first card can be operated with the low voltage.

5. The method of claim 1, wherein the first card is one of a subscriber identity module (SIM), a user identity module (UIM), a universal SIM (USIM) and a universal IC card (UICC), and the second card is a multimedia card (MMC).

* * * * *